United States Patent Office.

EMIL F. BAUDE, OF CINCINNATI, OHIO.

MANUFACTURE OF PORTLAND CEMENT.

SPECIFICATION forming part of Letters Patent No. 453,753, dated June 9, 1891.

Application filed December 10, 1889. Serial No. 333,252. (No specimens.)

*To all whom it may concern:*

Be it known that I, EMIL F. BAUDE, a citizen of the United States, and a resident of Cincinnati, in the county of Hamilton and State of Ohio, have invented certain new and useful Improvements in the Manufacture of Portland Cement, of which the following is a specification.

The object of my invention is to produce artificial Portland cement of reliable and uniform quality at but little cost of labor and material. It is well known that good artificial cement can only be made of lime and clay in certain proportions and that a variance of more than three to four per cent. in either of its principal components lime or clay will render the cement of little value. For this reason it is absolutely necessary to know the chemical composition of each of the materials before they are mixed together, as a mistake cannot be remedied by the process of calcining. It has therefore been very difficult, in fact impossible, to produce a good artificial Portland cement from material found in this country at a price that would compete with the imported article, because the limestone (carbonate of lime) is found not to be uniform in chemical proportions in the same bed or even in the same layers.

The clay which is used in the manufacture of Portland cement is generally found to be homogeneous, so that when the chemical composition of any portion of it is once ascertained it may be safely relied upon that all the clay in the same bed is composed of the same elements and in the same proportion.

I have discovered a process by which I am enabled to obtain pure lime from blue limestone formation, known to geologists as the "Hudson River" or "Cincinnati" group, or the uppermost formation of the lower Silurian age in the geological scale of the North American continent. This process is as follows: The limestone of the class referred to is first burned in a kiln, as is ordinarily done in the process of making lime. The lumps of calcined limestone as they come from the kiln are then placed in a wire basket and for a moment immersed in water. The lime is then emptied out of the basket upon a floor and allowed to remain until the lime is slaked. Only the pure lime will slaken by this treatment, while the foreign matter and impure lime—that is, lime containing silica—will not slaken, but remain in lumps. The pure lime in the form of a fine impalpable powder may then be separated from the hard solid particles by sifting, and is then ready to be mixed with the clay and the mixture treated in the usual manner. I have, therefore, the chemical properties of each of the elements, lime and clay, of which artificial Portland cement is formed definitely ascertained and ready to be mixed together in the proportions desired to make the different kinds of cement required for the various uses to which Portland cement is applied, and am therefore enabled to manufacture good artificial Portland cement from impure limestone cheaply and with uniformly good results.

As it has been heretofore impossible to make good artificial Portland cement from blue limestone of the class named and clay on account of the great variance in the composition of the limestone—that is, the varying percentage of the silica to the carbonate of lime—and as my discovery renders it easier and cheaper to make good cement than it has heretofore been to make the varying and imperfect cements now in common use,

I claim—

The process of obtaining pure lime for the manufacture of artificial Portland cement from blue limestone of the Hudson river or Cincinnati group, which consists in, first, calcining the limestone; second, moistening the calcined lumps by dipping them in water and quickly removing them, so that only the pure lime will slaken, and, third, separating the pure slaked lime from the impure and unslaked portions by sifting.

EMIL F. BAUDE.

Witnesses:
 FRANK L. MILLWARD,
 GEO. J. MURRAY.